United States Patent
Hishinuma et al.

(10) Patent No.: US 11,932,767 B2
(45) Date of Patent: Mar. 19, 2024

(54) ACTIVE ENERGY RAY CURABLE INK COMPOSITION AND METHOD FOR MANUFACTURING PRINTED MATTER USING SAME

(71) Applicant: SAKATA INX CORPORATION, Osaka (JP)

(72) Inventors: Keishiro Hishinuma, Osaka (JP); Naoki Omi, Osaka (JP); Yoshihiro Hisanaga, Osaka (JP); Aika Nishimoto, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 356 days.

(21) Appl. No.: 17/425,502

(22) PCT Filed: Dec. 11, 2019

(86) PCT No.: PCT/JP2019/048590
§ 371 (c)(1),
(2) Date: Jul. 23, 2021

(87) PCT Pub. No.: WO2020/162039
PCT Pub. Date: Aug. 13, 2020

(65) Prior Publication Data
US 2022/0098421 A1  Mar. 31, 2022

(30) Foreign Application Priority Data
Feb. 7, 2019 (JP) .................... 2019-020869

(51) Int. Cl.
| | | |
|---|---|---|
| C09D 11/101 | (2014.01) | |
| B41J 2/21 | (2006.01) | |
| B41M 7/00 | (2006.01) | |
| C09D 11/037 | (2014.01) | |
| C09D 11/105 | (2014.01) | |

(52) U.S. Cl.
CPC .......... C09D 11/101 (2013.01); B41J 2/2107 (2013.01); B41M 7/0081 (2013.01); C09D 11/037 (2013.01); C09D 11/105 (2013.01)

(58) Field of Classification Search
CPC ... C09D 11/101; C09D 11/037; C09D 11/105; C09D 11/36; C09D 11/40; C09D 11/30; C09D 11/38; C09D 11/32; C09D 11/322; C09D 11/324; C09D 11/328; C09D 11/102; C09D 11/005; C09D 11/54; C09D 11/52; C09D 11/106; B41J 2/2107; B41J 2/01; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41M 7/0081; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 3,673,140 A * | 6/1972 | Ackerman | ........... | C09D 11/101 |
| | | | | 523/508 |
| 4,221,686 A * | 9/1980 | Sakiyama | ............ | C09D 11/101 |
| | | | | 522/75 |
| 6,638,995 B1 * | 10/2003 | Gelarden | ............. | C09D 11/106 |
| | | | | 523/160 |
| 2003/0054103 A1 * | 3/2003 | Sato | ..................... | C09D 11/101 |
| | | | | 427/256 |
| 2003/0077384 A1 * | 4/2003 | Krysa | .................. | B05B 7/1626 |
| | | | | 427/427 |
| 2010/0210745 A1 | 8/2010 | McDaniel et al. | | |
| 2011/0014438 A1 | 1/2011 | Suwa et al. | | |

FOREIGN PATENT DOCUMENTS

| | | |
|---|---|---|
| JP | 63264686 A | 11/1988 |
| JP | 2002327136 A | 11/2002 |
| JP | 2002363446 A | 12/2002 |
| JP | 2004161812 A | 6/2004 |
| JP | 2005225903 A | 8/2005 |
| JP | 2010072130 A | 4/2010 |
| JP | 5477995 B | 4/2014 |
| JP | 2018058956 A | 4/2018 |
| JP | 2018065912 A | 4/2018 |
| WO | 2015068283 A1 | 5/2015 |

OTHER PUBLICATIONS

European Patent Office, Extended European Search Report Issued in Application No. 19914391.8, dated Sep. 28, 2022, Germany, 7 pages.

* cited by examiner

*Primary Examiner* — Manish S Shah
(74) *Attorney, Agent, or Firm* — Alleman Hall & Tuttle LLP

(57) ABSTRACT

To provide an active energy ray-curable ink composition that contains high rates of raw materials derived from biomass and can maintain basic characteristics, such as compatibility. Provided is an active energy ray-curable ink composition containing a pigment, a compound having ethylenically unsaturated bonds, and a rosin-modified alkyd resin, wherein the rosin-modified alkyd resin is a condensed polymer of an acid ingredient containing a resin acid, a fatty acid, and a polybasic acid with a polyhydric alcohol, and has a solubility parameter (sp) value of 9.0 to 11.0 $(cal/cm^3)^{1/2}$ as measured by turbidimetric titration and an acid value of 1 to 50 mg KOH/g.

6 Claims, No Drawings

ACTIVE ENERGY RAY CURABLE INK COMPOSITION AND METHOD FOR MANUFACTURING PRINTED MATTER USING SAME

TECHNICAL FIELD

The present invention relates to an active energy ray-curable ink composition and a method for manufacturing printed matter with the ink composition.

BACKGROUND ART

In the case of printing with ink compositions, various printing processes are appropriately selected depending on the materials and shapes of print targets, and ink compositions having appropriate properties are also selected according to the printing processes. For example, in an offset printing process with a lithographic printing plate on flat paper sheets, ink compositions having high viscosity containing vegetable oil or mineral oil are used. In a flexographic printing process with a rubbery relief printing plate on cardboard sheets, aqueous ink compositions having remarkably high fluidity are used. In addition, it is well known that various printing processes, such as gravure printing, screen printing, letterpress printing, and inkjet printing, are appropriately selected and put in practice. Among these processes, preferably selected is a printing process with a resin relief printing plate for printing on sticker labels or curved surfaces. In the printing process with the resin relief printing plate, a simple process of manufacturing the printing plate with a photosensitive resin composition has also been proposed (see, for example, PTL 1).

In printing processes, one essential step for forming images, in addition to fixing of the ink compositions to print targets, is drying of the ink compositions after printing. Insufficient drying causes the following problem: Since the ink composition immediately after printing is not sufficiently fixed on the surface of the target, the ink composition adheres to fingers with which the target is touched, and printed images will be blurred or contaminated when the targets are rubbed. Accordingly, the ink compositions should be sufficiently fixed or dried on the surfaces of the targets before the printed targets are transferred to a subsequent step. A variety of steps of fixing (i.e., drying) the ink compositions after printing are in practical use depending on the type of ink composition used. Examples of such steps include permeation of the solvents into the printed targets, evaporation of the solvents from the printed targets, and oxidative polymerization of ingredients contained in the ink compositions. All the drying steps involve a considerable amount of time. In contrast with such phenomena, the time required for the drying cannot be ignored because the printing speed has been improved due to technological advances in recent years.

In such circumstances, printing processes with active energy ray-curable ink compositions have recently been developed. In such an active energy ray-curable ink composition, the ingredients contained in the ink composition can be polymerized by irradiation with ultraviolet rays or electron beams to achieve the drying. Since the time required for the drying is significantly short, the printing with such an ink composition can meet the demand for promptly transferring of the printed matter to a subsequent step. Examples of the ink composition suitable for such a drying step includes an ink composition disclosed in PTL 2 for an offset printing process, and an ink composition disclosed in PTL 3 for a resin relief printing process.

In recent years, activities for a reduction in environmental load have been developed in various industrial and business categories, and their common ultimate goal is to achieve global environmental conservation. Also in the printing ink industry, the activities to promote the reduction in environmental load have been practiced from various viewpoints, and the print products that comply with the gist of such activities are given various kinds of certification marks. Examples of such certification marks include a Negative List (NL) regulation mark, a vegetable oil ink mark, a green printing (GP) mark, and a clione mark. In this situation, the Japan Printing Ink Makers Association has recently established a novel system called an ink green mark (hereinafter referred to as IG mark). The IG mark is based on the system where the level of environmental friendliness of the ink composition is categorized into three ranks depending on the rate of biomass-derived ingredients in all main ingredients that make up the ink composition as criteria of the mark. In other words, this system is characterized by promoting the replacement of fossil resource-derived raw materials with biomass-derived raw materials for the purpose of reduction in environmental load.

Also in the active energy ray-curable ink compositions described above, the products that can be dried with lower irradiation of ultraviolet rays and the energy-saving products that can be dried with light from light emitting diodes (LEDs) having lower power consumption are commercially available, and the movement leading to a reduction in environmental load is expanding similar to other ink compositions. However, the production of the active energy ray-curable ink compositions requires large amounts of monomers and oligomers; hence such ink compositions cannot contain high rates of biomass-derived ingredients. As a result, the criteria of certification of IG mark described above for the active energy ray-curable ink composition lacks in the rates of biomass-derived ingredients, and thereby such criteria use characteristics, such as recycling suitability and energy saving, on environmental friendliness in place of the rates of biomass-derived ingredients.

CITATION LIST

Patent Literatures

PTL 1: JP 2010-72130A
PTL2: JP 5477995B
PTL3: JP 2004-161812A

BRIEF DESCRIPTION OF THE INVENTION

Problems to be Solved

In the background described above, enrichments in biomass-derived ingredients are valuable to society and of great significance also in the active energy ray-curable ink compositions. However, the monomers and oligomers used in the active energy ray-curable ink compositions do not necessarily have good compatibility with the biomass-derived materials used in general ink compositions; hence, such biomass-derived materials cannot be readily applied to the active energy ray-curable ink compositions in the current situation.

An object of the present invention, which has been made in view of the above circumstances, is to provide an active energy ray-curable ink composition that contains high rates of raw materials derived from biomass and can maintain basic characteristics, such as compatibility.

Means to Solve Problems

As a result of diligent studies to solve the above problems, the present inventors have found that the use of a rosin-modified alkyd resin can solve the above problems in an active energy ray-curable ink composition containing a compound having ethylenically unsaturated bonds, and a photopolymerization initiator, wherein the rosin-modified alkyd resin is a condensed polymer of an acid ingredient containing a resin acid, a fatty acid, and a polybasic acid with a polyhydric alcohol, and has a solubility parameter (sp) value of 9.0 to 11.0 $(cal/cm^3)^{1/2}$ as measured by turbidimetric titration and an acid value of 1 to 50 mg KOH/g. The present invention has been completed based on such findings, and provides the following ink composition.

The present invention provides an active energy ray-curable ink composition containing a pigment, a compound having ethylenically unsaturated bonds, and a rosin-modified alkyd resin, wherein the rosin-modified alkyd resin is a condensed polymer of an acid ingredient containing a resin acid, a fatty acid, and a polybasic acid with a polyhydric alcohol, and has a solubility parameter (sp) value of 9.0 to 11.0 $(cal/cm^3)^{1/2}$ as measured by turbidimetric titration and an acid value of 1 to 50 mg KOH/g.

The oil length, which is the ratio (mass %) of the mass of the fatty acid moiety to the mass of the entire rosin-modified alkyd resin, is preferably 30 to 85.

The fatty acid in the rosin-modified alkyd resin preferably contains a fatty acid having 8 to 16 carbon atoms.

The fatty acid in the rosin-modified alkyd resin preferably contains a fatty acid derived from coconut oil or palm kernel oil.

The weight average molecular weight of the rosin-modified alkyd resin is preferably 1,000 to 70,000.

The active energy ray-curable ink composition preferably further contains a photopolymerization initiator.

The active energy ray-curable ink composition of the present invention is preferably used in resin relief printing.

The present invention also provides a method for manufacturing printed matter, which comprises a step of printing with the active energy ray-curable ink composition described above.

Advantageous Effects of the Invention

The present invention provides an active energy ray-curable ink composition that contains high rates of raw materials derived from biomass and can maintain basic characteristics, such as compatibility.

EMBODIMENTS OF THE INVENTION

Hereinafter, described are one embodiment of the active energy ray-curable ink composition of the present invention and one embodiment of the method for manufacturing printed matter of the present invention. The present invention should not be limited to the following embodiments, and can be appropriately modified within the scope of the present invention.

Active Energy Ray-Curable Ink Composition

The active energy ray-curable ink composition of the present invention (hereinafter, also simply referred to as "ink composition" or "the inventive ink composition") has curability by irradiation with active energy rays, and can immediately dry upon irradiation after printing. A preferred print process to which the inventive ink composition is applied is, but should not be limited to, resin relief printing. In the resin relief printing, an ink composition adheres to convex portions of a resin relief printing plate and the adhered ink composition is transferred to a print target. Examples of the print target include light printed matter, such as stickers and labels, and printed matter having curved surfaces. More specifically, examples of stickers and labels include stickers or thermal stickers made of synthetic paper or ordinary paper, and examples of the printed matter having curved surfaces include, but should not be limited to, containers such as beverage cups, ice cream cups, and noodle cups made of synthetic resin or ordinary paper. Examples of the synthetic resin constituting these containers include, but should not be limited to, amorphous polyethylene terephthalate (A-PET), polystyrene, expanded polystyrene, and polypropylene. Since the printing plate used in the resin relief printing is made of resin and can be deformed depending on the shape of the print target, printing can be performed even on the curved surfaces described above.

Examples of the active energy rays used in the curing of the inventive ink composition include electron beams and ultraviolet rays. Particularly preferred active energy rays are ultraviolet rays from the viewpoint of low costs and ease of machine handling. In the use of ultraviolet rays, the inventive ink composition needs to contain a photopolymerization initiator, which generates radicals upon photoirradiation. The wavelength of the ultraviolet rays may be appropriately determined depending on the absorption wavelength of the photopolymerization initiator to be employed, and may be 400 nm or less. Examples of the ultraviolet irradiator that generates such ultraviolet rays include metal halide lamps, high-pressure mercury lamps, excimer lamps containing rare gas, and ultraviolet light emitting diodes (LEDs). When electron beams are used in the active energy rays, the chemical bond contained in the ingredient of the ink composition is dissociated to generate radicals due to the irradiation of the electron beams, and these radicals can polymerize ingredients such as monomers in the ink composition, thereby no photopolymerization initiator is required.

The inventive ink composition contains a pigment and a compound having ethylenically unsaturated bonds, and further contains a specific rosin-modified alkyd resin. The containing of this specific rosin-modified alkyd resin can be regarded as a key point in the present invention. The rosin-modified alkyd resin to be employed is a condensed polymer of an acid ingredient containing a resin acid, a fatty acid, and a polybasic acid with a polyhydric alcohol, and has a solubility parameter (sp) value of 9.0 to 11.0 $(cal/cm^3)^{1/2}$ as measured by turbidimetric titration and an acid value of 1 to 50 mg KOH/g. An alkyd resin is used as one of the ingredients contained in a general offset printing ink composition that is not an active energy ray-curable ink composition, and is useful to achieve a higher biomass count (a higher content of biomass ingredient) because a fatty acid is used in a raw material. However, the alkyd resin cannot be readily used in the active energy ray-curable ink composition due to poor compatibility. In this respect, the present invention can solve the problem of poor compatibility through the use of a rosin-modified alkyd resin having a specific sp value.

The inventive ink composition may contain a photopolymerization initiator as described above. The inventive ink composition exhibits curability to electron beams even if the ink composition does not contain a photopolymerization initiator, but the addition of a photopolymerization initiator can exhibit curability to light such as ultraviolet rays. Each ingredient constituting the ink composition will now be described in sequence.

Pigment

Examples of the pigment include coloring pigments for imparting coloring power to the ink composition and colorless pigments for mainly imparting viscoelasticity to the ink composition. In the present invention, the coloring pigments include white pigments for whitening the ink composition, metal powder pigments for imparting a metallic color such as gold or silver color, and inorganic pigments for imparting a pearly color tone.

The coloring pigments are ingredients for imparting coloring power to the ink composition. Examples of the coloring pigments include, but are not limited to, organic and/or inorganic pigments conventionally used in ink compositions for printing.

Examples of the coloring pigments include yellow pigments, such as Disazo Yellow pigments (Pigment Yellows 12, 13, 17, and 1) and Hansa Yellow pigments; magenta pigments, such as Brilliant Carmine 6B, Lake Red C, and Watching Red; cyan pigments, such as phthalocyanine blue, phthalocyanine green, and alkali blue; black pigments, such as carbon black; fluorescent pigments; white pigments, such as titanium oxide; gold powder; bronze powder; aluminum paste where aluminum powder is processed into a paste; and mica powder.

The content of the coloring pigment is, for example, about 10 to 70 mass % in the entire ink composition, although the content is not essential. A yellow ink composition, a magenta ink composition, a cyan ink composition, or a black ink composition prepared with a yellow pigment, a magenta pigment, a cyan pigment, or a black pigment, respectively, may contain a pigment having another color or another ink composition having a different color as a complementary color.

The colorless pigments are also called extender pigments, which are preferably used for adjusting properties such as viscoelasticity in ink compositions. Examples of the colorless pigment include clay, talc, kaolinite (kaolin), barium sulfate, calcium carbonate, silicon oxide, bentonite, and titanium oxide. The content of colorless pigment is, for example, about 0 to 33 mass % in the entire ink composition, although the content is not essential.

Compound Having One or More Ethylenically Unsaturated Bonds

The compound having one or more ethylenically unsaturated bonds is an ingredient called a monomer or an oligomer that is polymerized by radicals generated from a photopolymerization initiator described later into a high molecular weight. Various polymers having ethylenically unsaturated bonds, which have a higher molecular weight than oligomers, are also commercially available. Such polymers can also be crosslinked with themselves or with the monomer or oligomer into a higher molecular weight. Such polymers may thus be used as compounds having ethylenically unsaturated bonds together with the monomer or oligomer.

The monomer having one or more ethylenically unsaturated bonds can be polymerized into a high molecular weight, as described above. In many cases, the monomer is a liquid ingredient having a relatively low molecular weight before polymerization and is used as a solvent for dissolving a resin ingredient into a varnish and for adjusting the viscosity of the ink composition. Examples of the monomer include monofunctional monomers having one ethylenically unsaturated bond in the molecule and bi- or higher functional monomers having two or more ethylenically unsaturated bonds in the molecule. The bi- or higher functional monomer can mutually crosslink during the curing of the ink composition, thereby contributing to an increase in curing rate and formation of a rigid film. The monofunctional monomer has no crosslinking ability as described above, thereby contributing to a reduction in curing contraction due to crosslinking. These monomers can be used in combination of several types as needed.

Examples of the monofunctional monomers include alkyl acrylates, such as methyl (meth)acrylate, ethyl (meth)acrylate, butyl (meth)acrylate, hexyl (meth)acrylate, octyl (meth)acrylate, dodecyl (meth)acrylate; and (meth)acrylic acid, ethylene oxide adduct (meth)acrylate, propylene oxide adduct (meth)acrylate, isobornyl (meth)acrylate, cyclohexyl (meth)acrylate, tricyclodecane monomethylol (meth)acrylate, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, hydroxypentyl (meth)acrylate, 2-hydroxy-3-phenoxypropyl (meth)acrylate, 2-hydroxy-3-butoxypropyl (meth)acrylate, 2-hydroxy-3-methoxypropyl (meth)acrylate, di(ethylene glycol) mono(meth)acrylate, tri(ethylene glycol) mono (meth)acrylate, poly(ethylene glycol) mono(meth)acrylate, di(propylene glycol) mono(meth)acrylate, poly(propylene glycol) mono(meth)acrylate, glycerol mono(meth)acrylate, acryoloxyethyl phthalate, 2-(meth)acryloyloxyethyl-2-hydroxy ethyl phthalate, 2-(meth)acryloyloxypropyl phthalate, β-carboxyethyl (meth)acrylate, (meth)acrylic acid dimer, ω-carboxypoly caprolactone mono(meth)acrylate, dimethylaminoethyl (meth)acrylate, diethylaminoethyl (meth)acrylate, N-vinylpyrrolidone, N-vinylformamide, and (meth)acryloylmorpholine. These monofunctional monomers may be used alone or in combination. Throughout the specification, the term "(meth)acrylate" indicates "acrylate and/or methacrylate", and the term "(meth)acrylic acid" indicates "acrylic acid and/or methacrylic acid".

Examples of the di- or higher functional monomers include difunctional monomers, such as ethylene glycol di(meth)acrylate, di(ethylene glycol) di(meth)acrylate, tri (ethylene glycol) di(meth)acrylate, poly(ethylene glycol) di(meth)acrylate, propylene glycol di(meth)acrylate, di(propylene glycol) di(meth)acrylate, tri(propylene glycol) di(meth)acrylate, poly(propylene glycol) di(meth)acrylate, butylene glycol di(meth)acrylate, pentyl glycol di(meth) acrylate, neopentyl glycol di(meth)acrylate, hydroxypivalyl hydroxypivalate di(meth)acrylate, hydroxypivalyl hydroxypivalate dicaprolactonate di(meth)acrylate, 1,6-hexanediol di(meth)acrylate, 1,2-hexanediol di(meth)acrylate, 1,5-hexanediol di(meth)acrylate, 2,5-hexanediol di(meth)acrylate, 1,7-heptanediol di(meth)acrylate, 1,8-octanediol di(meth)acrylate, 1,2-octanediol di(meth)acrylate, 1,9-nonanediol di(meth)acrylate, 1,2-decanediol di(meth)acrylate, 1,10-decanediol di(meth)acrylate, 1,2-decanediol di(meth)acrylate, 1,12-dodecanediol di(meth)acrylate, 1,2-dodecanediol di(meth)acrylate, 1,14-tetradecanediol di(meth)acrylate, 1,2-tetradecanediol di(meth)acrylate, 1,16-hexadecanediol di(meth)acrylate, 1,2-hexadecanediol di(meth) acrylate, 2-methyl-2,4-pentanediol di(meth)acrylate, 3-methyl-1,5-pentanediol di(meth)acrylate, 2-methyl-2-propyl-1,3-propanediol di(meth)acrylate, 2,4-dimethyl-2,4- pentanediol di(meth)acrylate, 2,2-diethyl-1,3-propanediol di(meth)acrylate, 2,2,4-trimethyl-1,3-pentanediol di(meth)acrylate, dimethyloloctane di(meth)acrylate, 2-ethyl-1,3-hexanediol di(meth)acrylate, 2,5-dimethyl-2,5-hexanediol di(meth)acrylate, 2-methyl-1,8-octanediol di(meth)acrylate, 2-butyl-2-ethyl-1,3-propanediol di(meth)acrylate, 2,4-diethyl-1,5-pentanediol di(meth)acrylate, 1,2-hexanediol di(meth)acrylate, 1,5-hexanediol di(meth)acrylate, 2,5-hexanediol di(meth)acrylate, 1,7-heptanediol di(meth)acrylate, 1,8-octanediol di(meth)acrylate, 1,2-octanediol di(meth)acrylate, 1,9-nonanediol di(meth)acrylate, 1,2-decanediol di(meth)acrylate, 1,10-decanediol di(meth)acrylate, 1,2-decanediol di(meth)acrylate, 1,12-dodecanediol di(meth)acrylate, 1,2-dodecanediol di(meth)acrylate, 1,14-tetradecanediol di(meth)acrylate, 1,2-tetradecanediol di(meth)acrylate, 1,16-hexadecanediol di(meth)acrylate, 1,2-hexadecanediol di(meth)acrylate, 2-methyl-2,4-pentane di(meth)acrylate, 3-methyl-1,5-pentanediol di(meth)acrylate, 2-methyl-2-propyl-1,3-propanediol di(meth)acrylate, 2,4-dimethyl-2,4-pentanediol di(meth)acrylate, 2,2-diethyl-1,3-propanediol di(meth)acrylate, 2,2,4-trimethyl-1,3-pentanediol di(meth)acrylate, dimethyloloctane di(meth)acrylate, 2-ethyl-1,3-hexanediol di(meth)acrylate, 2,5-dimethyl-2,5-hexanediol di(meth)acrylate, 2-butyl-2-ethyl-1,3-propanediol di(meth)acrylate, 2,4-diethyl-1,5-pentanediol di(meth)acrylate, tricyclodecane dimethylol di(meth)acrylate, tricyclodecane dimethylol dicaplolactonate di(meth)acrylate, bisphenol A tetra(ethylene oxide) adduct di(meth)acrylate, bisphenol F tetra(ethylene oxide) adduct di(meth)acrylate, bisphenol S tetra(ethylene oxide) adduct di(meth)acrylate, hydrogenated bisphenol A tetra(ethylene oxide) adduct di(meth)acrylate, hydrogenated bisphenol F tetra(ethylene oxide) adduct di(meth)acrylate, hydrogenated bisphenol A di(meth)acrylate, hydrogenated bisphenol F di(meth)acrylate, bisphenol A tetra(ethylene oxide) adduct dicaplolactonate di (meth) acrylate, and bisphenol F tetra(ethylene oxide) adduct dicaplolactonate di(meth)acrylate; and trifunctional monomers, such as glycerol tri(meth)acrylate, trimethylolpropane tri(meth)acrylate, trimethylolpropane tricaplolactonate tri(meth)acrylate, trimethylolethane tri(meth)acrylate, trimethylolhexane tri(meth)acrylate, trimethyloloctane tri(meth)acrylate, and pentaerythritol tri(meth)acrylate; and tetra- or higher functional monomers, such as trimethylolpropane tetra(meth)acrylate, pentaerythritol tetra(meth)acrylate, pentaerythritol tetracaplolactonate tetra(meth)acrylate, diglycerol tetra(meth)acrylate, ditrimethylolpropane tetra(meth)acrylate, ditrimethylolpropane tetracaplolactonate tetra(meth)acrylate, ditrimethylolethane tetra(meth)acrylate, ditrimethylolbutane tetra(meth)acrylate, ditrimethylolhexane tetra(meth)acrylate, ditrimethyloloctane tetra(meth)acrylate, dipentaerythritol penta(meth)acrylate, dipentaerythritol hexa(meth)acrylate, tridipentaerythritol hexa(meth)acrylate, tripentaerythritol hepta(meth)acrylate, tripentaerythritol octa(meth)acrylate, and tripentaerythritol poly(alkylene oxide) hepta(meth)acrylate. These di- or higher functional monomers may be used alone or in combination.

Another type of monomer is acrylate of epoxidized vegetable oil prepared through acrylic modification of epoxidized vegetable oil. This acrylate is a compound produced by ring-opening addition polymerization of (meth)acrylic acid to epoxy groups in the epoxidized vegetable oil prepared through epoxidization of double bonds in unsaturated vegetable oil with an oxidizing agent, for example, peracetic acid or perbenzoic acid. The unsaturated vegetable oil indicates triglyceride of at least one fatty acid having at least one carbon-carbon unsaturated bond. Examples of the vegetable oil include hemp seed oil, linseed oil, perilla oil, oiticica oil, olive oil, cocoa oil, kapok oil, kaya oil, mustard oil, apricot oil, tung oil, kukui oil, walnut oil, poppy oil, sesame oil, safflower oil, radish seed oil, soybean oil, hydnocarpus oil, camellia oil, corn oil, rapeseed oil, niger oil, rice-bran oil, palmoil, castor oil, sunflower oil, grape seed oil, almond oil, pine seed oil, cottonseed oil, coconut oil, peanut oil, and dehydrated castor oil. Since this type of monomer is derived from the vegetable oil, this serves to increase the amount of biomass ingredients in the ink composition. Several types of acrylates of epoxidized vegetable oil are commercially available and may thus be used.

The oligomer is a polymerized ingredient that has a high molecular weight, as described above. The oligomer inherently has a relatively high molecular weight, and thereby can be used for imparting appropriate viscosity and elasticity to the ink composition. Examples of the oligomers include epoxy-modified (meth)acrylates, such as esters formed by a reaction of (meth)acrylic acid with hydroxyl groups generated after opening of the epoxy rings contained in epoxy compounds, such as epoxy resins, using acids or bases; rosin-modified epoxidized acrylates; polyester-modified (meth)acrylates, such as esters formed by a reaction of (meth)acrylic acid with terminal hydroxyl groups of condensates of dibasic acids and diols; polyether-modified (meth)acrylates, such as esters formed by a reaction of (meth)acrylic acid with terminal hydroxyl groups of polyethers; and urethane-modified (meth)acrylates, such as esters formed by a reaction of (meth)acrylic acid with terminal hydroxyl groups of condensates of polyisocyanates and polyols. Such oligomers are commercially available under trade names, for example, Evecryl series available from Daicel Cytech Co., Ltd.; CN and SR series available from Sartomer Co., Ltd.; Aronix M-6000 series, 7000 series, 8000 series, Aronix M-1100, Aronix M-1200, and Aronix M-1600 available from Toagosei Co., Ltd.; and NK Oligo available from Shin-Nakamura Chemical Co., Ltd. These oligomers can be used alone or in combination.

The polymer having ethylenically unsaturated bonds is an ingredient that increases the molecular weight together with the monomers and oligomers, and has a high molecular weight even before irradiation with active energy rays, thereby enhancing the viscoelasticity of the ink composition. Such a polymer is used, for example, in a form of solution or dispersion in a monomer that is a low-viscosity liquid. Examples of the polymer having ethylenically unsaturated bonds include poly(diallyl phthalate), acrylic resins including unreacted and unsaturated groups, and acryl-modified phenol resins.

The content of the compound having one or more ethylenically unsaturated bonds in the ink composition is preferably 30 to 70 mass %, more preferably 40 to 60 mass %. Such a range of content of the compound having one or more ethylenically unsaturated bonds results in both high curability and superior printability. The content of the polymer having ethylenically unsaturated bonds is preferably 0 to 50 mass %, more preferably 0 to 30 mass %, and further more preferably 0 to 20 mass %. Such a range of content of the polymer preferably results in high curability of the ink composition as well as a reduction in misting through imparting appropriate viscoelasticity to the ink composition.

Rosin-Modified Alkyd Resin

The rosin-modified alkyd resin is a condensed polymer of an acid ingredient containing a resin acid, a fatty acid, and a polybasic acid with a polyhydric alcohol, and has a solubility parameter (sp) value of 9.0 to 11.0 (cal/cm$^3$)$^{1/2}$ as measured by turbidimetric titration and an acid value of 1 to 50 mg KOH/g. The use of such a rosin-modified alkyd resin can have high rates of the biomass-derived ingredients in the ink composition and achieve good compatibility in the ink composition. In addition, the rosin-modified alkyd resin includes backbones of resin acid in its polymer chain or side chain, and thereby has superior affinity to pigments and high dispersibility of pigments as well as good gloss of the ink compositions after printing. In the case of a print target of a non-permeable material such as a film sheet, chlorine-based materials such as chlorinated polyester have been conventionally used for an improvement in adhesion between the coating (i.e., the printed image) formed with the ink composition and the print target. However, such chlorine-based materials generate dioxin at the time of incineration, resulting in increases in environmental loads. Since the rosin-modified alkyd resin used in the inventive ink composition exhibits high adhesion to targets such as film sheets, the inventive ink composition containing the rosin-modified alkyd resin also exhibits high adhesion to the targets, such as film sheets, without containing the chlorine-based materials.

As described above, the inventive ink composition contains ingredients, such as monomers and oligomers, that have a relatively high sp value. Accordingly, the rosin-modified alkyd resin used in the inventive ink composition should also have an sp value of 9.0 to 11.0 (cal/cm$^3$)$^{1/2}$, which is at a higher level among similar resin materials. As a result, the inventive ink composition has good compatibility. The lower limit of solubility parameter (sp) value of the rosin-modified alkyd resin is more preferably 9.2 (cal/cm$^3$)$^{1/2}$, further more preferably 9.4 (cal/cm$^3$)$^{1/2}$ as measured by turbidimetric titration. The upper limit of solubility parameter (sp) value of the rosin-modified alkyd resin is more preferably 10.5 (cal/cm$^3$)$^{1/2}$, further more preferably 10.0 (cal/cm$^3$)$^{1/2}$ as measured by turbidimetric titration.

The calculation of solubility parameter (sp) value by turbidimetric titration will now be described. The value can be measured by turbidimetric titration, which is a simple and practical measurement, and calculated in accordance with the following expression of K. W. Suh and J. M. Corbett (see J. Appl. Polym. Sci. 1968, 12, 2359 on calculation of the sp value):

$$\text{sp value} = (V_{ml}^{1/2} \cdot \delta H + V_{mh}^{1/2} \cdot \delta D)/(V_{ml}^{1/2} + V_{mh}^{1/2})$$

In the turbidimetric titration, 0.5 g of sample is dissolved in 10 mL of toluene or trimethylolpropane triacrylate (TMPTA), which is a good solvent, and then n-hexane, which is a poor solvent having a low sp value, is gradually added to the resultant solution while the volume of titration H (mL) is recorded at a turbid point. Similarly, ethanol, which is a poor solvent having a high sp value, is gradually added to the toluene solution while the volume of titration D (mL) is recorded at a turbid point. The values H and D are substituted into the following expressions to calculate $V_{ml}$, $V_{mh}$, $\delta H$, and $\delta D$, and these values can be substituted into the expression described above to calculate the sp value.

The molecular volume and sp value of each solvent used in the turbidimetric titration are as follows:

(Molecular volume of good solvent) φ0, toluene: 106.28 mL/mol, TMPTA: 279.55 mL/mol (Molecular volume of poor solvent having low sp value) φ1, n-hexane: 131.61 mL/mol (Molecular volume of poor solvent having high sp value) φh, ethanol: 58.39 mL/mol (SP value of each solvent) toluene: 9.14, TMPTA: 9.88, n-hexane: 7.28, ethanol: 12.58

$V_{ml} = (\varphi 0 \cdot \varphi 1)/\{(1-VH) \cdot \varphi 1 + VH \cdot \varphi 0\}$
$V_{mh} = (\varphi 0 \cdot \varphi h)/\{(1-VH) \cdot \varphi h + VH \cdot \varphi 0\}$
$VH = H/(M+H)$
$VD = D/(M+D)$
$\delta H = (\delta 0 \cdot M)/(M+H) + (\delta 1 \cdot H)/(M+H)$
$\delta D = (\delta 0 \cdot M)/(M+D) + (\delta 1 \cdot D)/(M+D)$
δ0: sp value of good solvent
δ1: sp value of poor solvent having low sp value
δh: sp value of poor solvent having high sp value
H: volume of titration of poor solvent having low sp value (mL)
D: volume of titration of poor solvent having high sp value (mL)
M: volume of good solvent (mL)
VH: volume fraction of titration of poor solvent having low sp value (%)
VD: volume fraction of titration of poor solvent having high sp value (%)

The rosin-modified alkyd resin has an acid value of 1 to 50 mg KOH/g. The acid value of 50 mg KOH or less can prevent the occurrence of problems, such as abnormal emulsification, in the offset ink composition to which the rosin-modified alkyd resin is applied. The acid value is preferably 1 to 25 mg KOH, more preferably 1 to 10 mg KOH.

The rosin-modified alkyd resin preferably has a weight average molecular weight of 1,000 to 70,000. In the preferred range, the weight average molecular weight of 1,000 or more can cause higher dispersibility of pigments and impart satisfactory viscoelasticity to the ink composition, and the weight average molecular weight of 70,000 or less can cause higher solubility and ease of handling.

As described above, the rosin-modified alkyd resin is a condensed polymer of an acid ingredient containing a resin acid, a fatty acid, and a polybasic acid with a polyhydric alcohol. These ingredients will now be described in sequence.

The resin acid encompasses abietic acid, isomers thereof and derivatives thereof contained in rosins. The rosins are non-volatile ingredients of pine resin collected fromPinaceae plants, and contain abietic acid and isomers thereof as main ingredients. Examples of the abietic acid and isomers thereof include abietic acid, neoabietic acid, palustric acid, pimaric acid, isopimaric acid, and dehydroabietic acid, and all of which have carboxyl groups and formesters with polyhydric alcohols described later. Introduction of such a resin acid into the rosin-modified alkyd resin can enhance the affinity to pigments, and raise the rate of the ingredients derived from biomass in the resultant rosin-modified alkyd resin.

Abietic acid and its isomers contain only one carboxyl group, although the modification of abietic acid and its isomers can introduce multiple carboxyl groups. For example, abietic acid is a trans-diene compound, but can be isomerized into a cis-diene compound through heating. The Diels-Alder reaction of the resultant cis-diene compound with a dienophil compound having two or more carboxyl groups, such as maleic acid and 1,2-cyclohexenedycarboxylic acid, can introduce these carboxyl groups into the backbone of abietic acid. In addition, molecules of abietic acid or its isomers can be polymerized to synthesize polymerized rosin compound, which compound also has multiple carboxyl groups. The derivatives of abietic acid and its isomers refer to such compounds.

Since rosins contain a resin acid as a main ingredient, the rosins themselves may be used in place of the resin acid. Although several types of rosins are known depending on manufacturing processes and subsequent chemical treatments, all types of rosins may be used. Examples of such rosins include gumrosins, wood rosins, tall rosins, disproportionated rosins, hydrogenated rosins, and polymerized rosins. The rosins may be modified through the Diels-Alder reaction as described above. From the viewpoint of storage stability, the rosins that chemically have no or a few conjugated double bonds should preferably be used. Examples of such rosins may include disproportionated rosins and hydrogenated rosins. However, rosins having conjugated double bonds can also be used without any problem, although they cause the synthesized resin to have slightly poor storage stability.

The fatty acid is yielded through hydrolyzation of natural fats and oils, such as vegetable oils and animal oils, and have one carboxyl group that can formesters with polyhydric alcohols described later. Introduction of such a fatty acid into the rosin-modified alkyd resin can raise the rate of biomass-derived ingredients in the resulting rosin-modified alkyd resin. From this point of view, the fatty acid is used in such an amount that the oil length, which is the ratio (mass %) of the mass of the fatty acid moiety to the total mass of the resin, exhibits preferably about 30 to 85 and more preferably about 50 to 85.

As already described, one of the characteristics in a process for preparing a rosin-modified alkyd resin in the present invention is to select a fatty acid such that the rosin-modified alkyd resin has an sp value of 9.0 to 11.0 $(cal/cm^3)^{1/2}$ as measured by turbidimetric titration. Such a value is at a relatively high level among similar resins, and the prepared rosin-modified alkyd resin having such a high sp value can exhibit satisfactory compatibility with monomers and oligomers similarly having a high sp value.

Examples of the fatty acid include caprylic acid, pelargonic acid, capric acid, lauric acid, myristic acid, pentadecylic acid, palmitic acid, margaric acid, stearic acid, oleic acid, linoleic acid, arachidic acid, and behenic acid. The fatty acid is a compound that has one or more carboxyl groups and a relatively high sp value. Fatty acid having a smaller number of carbon atoms has a tendency toward a higher sp value. Fromsuch a viewpoint, fatty acids having 8 to 16 carbon atoms can be preferably used, and fatty acids having 8 to 14 carbon atoms can be more preferably used in the present invention. The use of one or more fatty acids each having such a high sp value in combination can also increase the sp value of the prepared rosin-modified alkyd resin. In this situation, preferred examples of the fatty acid include caprylic acid, pelargonic acid, capric acid, lauric acid, myristic acid, pentadecylic acid, and palmitic acid. All these fatty acids have sp values of 9.18 or more as calculated by the Fedors method. However, the above description does not indicate that fatty acid having a lower sp value than 9.18 cannot be used, but does that even fatty acid having a lower sp value can be used without problems if combined with fatty acids each having a higher sp value. In any case, these fatty acids may be appropriately combined such that the prepared rosin-modified alkyd resin has a solubility parameter (sp) value of 9.0 to 11.0 $(cal/cm^3)^{1/2}$ as measured by turbidimetric titration. The fatty acids may be unsaturated or saturated, but those containing one or less unsaturated bond per molecule are preferably used to avoid color change. Fatty acids having two or more unsaturated bonds, such as oleic acid, linoleic acid, and eleostearic acid are desirably used after epoxidizing and eliminating double bond moieties by oxidative treatment. Such modified fatty acids can also be used as the fatty acids in the present invention. These fatty acids can be used alone or in combination.

The fatty acids having a smaller number of carbon atoms are preferred, as described above. From such a viewpoint, the fatty acids, such as coconut oil or palm kernel oil, are preferably used. These fatty acids contain lots of fatty acids having 12 to 14 carbon atoms, and thereby can be preferably used to adjust the rosin-modified alkyd resin so as to have a high sp value. However, as long as the rosin-modified alkyd resin has a final sp value of 9.0 to 11.0 $(cal/cm^3)^{1/2}$, fatty acids derived from other fats and oils may be used to achieve the sp value within such a range.

The polybasic acid is a compound having two or more carboxyl groups, and is an ingredient used in a polycondensation process with polyhydric alcohol described later into a high molecular weight. The compounds having two or more carboxyl groups include, but are not limited to, those used in the synthesis of alkyd resins, and anhydrides thereof.

Examples of such compounds include phthalic anhydride, isophthalic acid, terephthalic acid, adipic acid, trimellitic acid, 1,2-cyclohexanedicarboxylic acid, 1,3-cyclohexenedicarboxylic acid, 1,4-cyclohexenedicarboxylic acid, hexahydrophthalic anhydride, 5-sodiosulfoisophthalic acid, fumaric acid, benzoic acid, tert-butylbenzoic acid, tetrahydrophthalic anhydride, maleic anhydride, succinic acid, succinic anhydride, fumaric acid, sebacic acid, azelaic acid, tetrabromophthalic anhydride, methylhymic anhydride, tetrachlorophthalic anhydride, hexahydrophthalic anhydride, pyromellitic anhydride, trimellitic anhydride, and methylcyclohexenedicarboxylic anhydride. These compounds can be used alone or in combination.

The polyhydric alcohol forms an ester with an acid ingredient containing a resin acid, a fatty acid, and a polybasic acid as described above into a high molecular weight. The polyhydric alcohols include, but are not limited to, compounds which have been used in the synthesis of alkyd resins, and may be compounds having two or more hydroxyl groups.

Examples of such compounds include ethylene glycol, 1,3-propanediol, 1,2-propanediol, 1,4-butanediol, diethylene glycol, triethylene glycol, polyethylene glycol, dipropylene glycol, 1,3-butanediol, neopentyl glycol, spiroglycol, dioxane glycol, adamantanediol, 3-methyl-1,5-pentanediol, methyl octanediol, 1,6-hexanediol, 1,4-cyclohexanedimethanol, 2-methyl-1,3-propanediol, 3-methyl-1,5-pentanediol, hexamethylene glycol, octylene glycol, 9-nonanediol, 2,4-diethyl-1,5-pentanediol, ethylene oxide-modified compound of bifunctional phenol such as bisphenol A, propylene oxide-modified compound of bifunctional phenol such as bisphenol A, ethylene oxide of bisphenol A, propylene oxide copolymer-modified compound, copolymer polyether polyol of ethylene oxide with propylene oxide, polycarbonate diol, adamantanediol, polyether diol, polyester diol, and polycaprolactone diol. These compounds can be used alone or in combination.

In order to adjust the molecular weight of the rosin-modified alkyd resin, a monobasic acid other than the fatty acid may be added as an acid ingredient. Examples of such a monobasic acid include benzoic acid, acetic acid, propionic acid, and butyric acid.

A process for preparing a rosin-modified alkyd resin with these ingredients will now be described. The rosin-modified alkyd resin is prepared through the reaction of an acid ingredient containing a resin acid, a fatty acid, and a polybasic acid with a polyhydric alcohol. The reaction procedure may include the steps of: charging these raw materials in a reaction vessel; adding a small amount of a solvent such as xylene into the vessel, and then heating the system under a flow of inert gas such as nitrogen gas to forma rosin-modified alkyd resin through a polycondensation process with azeotropic distillation for removing water produced by condensation. The temperature during the reaction may be kept at about 170 to 250° C. and the reaction time may be about 5 to 25 hours, although the temperature and the time are not essential. The termination of the reaction can be determined by monitoring the acid value of the reaction mixture along with the elapsed time of the reaction. In other words, the termination of the reaction can be determined at a time when a decrease in the acid value of the reaction mixture stops accompanied with the polycondensation process. The polycondensation reaction can be carried out in a shorter time by discharging the water generated through the polycondensation out of the reaction system or employing a reaction catalyst. Examples of the reaction catalyst include tetrabutyl zirconate, monobutyltin oxide, zirconiumnaphthenate, and tetrabutyl titanate.

As already described, the rosin-modified alkyd resin preferably has a weight average molecular weight of about 1,000 to 70,000. Since the weight average molecular weight of the rosin-modified alkyd resin is determined depending on the ratio of the acid ingredient to the polyhydric alcohol, it is preferred that the first run in the synthesis of the rosin-modified alkyd resin should be performed on a small scale to fix appropriate reaction conditions and types of raw materials and subsequent runs on a large scale using the fixed conditions and types.

It is essential to select the type and amount of the fatty acid used in raw materials such that the rosin-modified alkyd resin yielded through the polycondensation reaction has a solubility parameter (sp) value of 9.0 to 11.0 $(cal/cm^3)^{1/2}$ as measured by turbidimetric titration. Accordingly, it is preferred that the first run in the synthesis of the rosin-modified alkyd resin should be performed on a small scale to fix appropriate reaction conditions and types of raw materials and subsequent runs on a large scale using the fixed conditions and types, similar to the adjustment of the weight average molecular weight described above. As already described, the rosin-modified alkyd resin has a solubility parameter (sp) value of preferably 9.3 to 10.0 $(cal/cm^3)^{1/2}$ and more preferably 9.5 to 10.0 $(cal/cm^3)^{1/2}$ as measured by turbidimetric titration.

Also as already described, the rosin-modified alkyd resin yielded through the polycondensation reaction has an acid value of 1 to 50 mg KOH. An acid value of 50 mg KOH or less can prevent the occurrence of problems, such as abnormal emulsification, in the offset ink composition to which the rosin-modified alkyd resin is applied. The acid value is preferably 1 to 25 mg KOH, more preferably 1 to 10 mg KOH. Since the acid value of the rosin-modified alkyd resin at the completion of the reaction is determined depending on the ratio of the acid ingredient to the polyhydric alcohol, it is preferred that the rosin-modified alkyd resin should be initially synthesized on a small scale to fix the appropriate reaction conditions and types of raw materials and then synthesized on a large scale using the fixed conditions and types, similar to the adjustment of the weight average molecular weight described above.

The rosin-modified alkyd resin may be prepared by any process other than the above process based on the reaction of an acid ingredient containing a resin acid, a fatty acid, and a polybasic acid with a polyhydric alcohol. Examples of the other process include the steps of: preparing a reaction intermediate through a transesterification reaction of vegetable oil and/or fatty acid ester thereof with a polyhydric alcohol, and then polycondensing the reaction intermediate with one of the following materials (1) to (3); or preparing another reaction intermediate through a transesterification reaction of vegetable oil and/or fatty acid ester thereof with one of the following materials (1) to (3), and then polycondensing the reaction intermediate with a polyhydric alcohol.

(1) a resin acid and a polybasic acid
(2) a resin acid derivative having two or more carboxyl groups
(3) a resin acid derivative having two or more carboxyl groups, and a polybasic acid The content of the rosin-modified alkyd resin in the entire ink composition may be about 1 to 25 mass %.

Photopolymerization Initiator

The photopolymerization initiator is an ingredient that generates radicals by irradiation with ultraviolet rays, and the resultant radicals polymerize the compound having one or more ethylenically unsaturated bonds described above, thereby curing the ink composition. The photopolymerization initiator may be any material that generates radicals by irradiation with active energy rays. As described above, the inventive ink composition can be cured with electron beams as active energy rays without addition of the photopolymerization initiator to the inventive ink composition.

Examples of the photopolymerization initiator include benzophenone, diethylthioxanthone, 2-methyl-1-(4-methylthio)phenyl-2-morpholinopropane-1-one, 4-benzoyl-4'-methyldiphenylsulfide, 1-chloro-4-propoxythioxanthone, isopropylthioxanthone, 2-hydroxy-2-methyl-1-phenylpropane-1-one, 1-hydroxycyclohexylphenyl ketone, bis-2,6-dimethoxybenzoyl-2,4,4-trimethylpentylphosphine oxide, 1-[4-(2-hydroxyethoxy)-phenyl]-2-hydroxy-2-methyl-1-propane-1-one, 2,2-dimethyl-2-hydroxyacetophenone, 2,2-dimethoxy-2-phenylacetophenone, 2,4,6-trimethylbenzyldiphenylphosphine oxide, and 2-benzyl-2-dimethylamino-1-(morpholinophenyl)-butan-1-one. Such photopolymerization initiators are commercially available under trade names, for example, Irgacure 907, Irgacure 369, Irgacure 184, Irgacure 379, Irgacure 819, and TPO available from BASF; and DETX available from Lamberti S.p.A. These photopolymerization initiators can be used alone or in combination.

The content of the photopolymerization initiator in the ink composition is preferably 3 to 30 mass %, more preferably 2 to 15 mass %, and further more preferably 2 to 13 mass %. Such a range of content of the photopolymerization initiator in the ink composition preferably results in sufficient curing of the ink composition and compatibility between satisfactory internal curing and material costs.

Oil Ingredient

The inventive ink composition may contain an oil ingredient in addition to the ingredients described above. Examples of the oil ingredient include oils and fats derived from animals and vegetables or modified products thereof. The inventive ink composition can contain these oil ingredients to further increase the biomass count. Examples of fats and oils derived from animals and vegetables include linseed oil, tung oil, soybean oil, safflower oil, tall oil, and cashew nut shell liquid. Examples of modified products of fats and oils derived from animals and vegetables, or thermally polymerized oils or oxidatively polymerized oils of the fats and oils derived from animals and vegetables include monoesters of vegetable oils, such as linseed oil fatty acid methyl ester, soybean oil fatty acid methyl ester, linseed oil fatty acid ethyl ester, soybean oil fatty acid ethyl ester, linseed oil fatty acid propyl ester, soybean oil fatty acid propyl ester, linseed oil fatty acid butyl ester, soybean oil fatty acid butyl ester, linseed oil fatty acid isobutyl ester, and soybean oil fatty acid isobutyl ester; dehydrated castor oil; hardened castor oil; polymerized castor oil; unsaturated animal and vegetable oils or epoxidized products of fatty acids thereof; polymerized products of cashew nut shell liquid; and cashew nut shell liquid-modified derivatives.

Other Ingredients

The inventive ink composition may further contain any other ingredient, as needed, in addition to the ingredients described above. Examples of such ingredients include resin ingredients, polymerization inhibitors, dispersants, salts such as phosphates, waxes such as polyethylene wax, olefin wax and Fischer-Tropsch wax, and alcohols.

The resin ingredient imparts appropriate properties, such as printability and viscoelasticity, to the ink composition. Such resin ingredients include various resins that have been conventionally used in the ink compositions, and preferably have compatibility with the monomers and oligomers. Examples of the resin ingredient include styrene-acrylic resins, acrylic resins, alkyd resins, rosin-modified phenol resins, rosin-modified maleic resins, rosin-modified petroleumresins, rosin ester resins, petroleumresin-modified phenol resins, vegetable oil-modified alkyd resins, and petroleumresins. The resin ingredient in this paragraph refers to a resin ingredient different from the rosin-modified alkyd resin already described.

The content of the resin ingredient in the ink composition is preferably 1 to 30 mass %, more preferably 1 to 20 mass %, and further more preferably 1 to 15 mass %. Such a range in content of the resin ingredient preferably imparts appropriate viscoelasticity to the ink composition, prevents the occurrence of misting, and achieves high curability of the ink composition.

Examples of the polymerization inhibitor preferably include phenol compounds such as butylhydroxytoluene, tocopherol acetate, nitrosamine, benzotriazole, and hindered amine. More preferred is butylhydroxytoluene. The addition of such polymerization inhibitors to the ink composition can prevent an increase in viscosity of the ink composition caused by the progress of polymerization reaction during storage. The content of the polymerization inhibitor is, for example, about 0.01 to 1 mass % in the ink composition.

The dispersant is used to improve the dispersion of the coloring agents and extender pigments contained in the ink composition. Various types of dispersants are commercially available, for example, DISPERBYK™ series available from BYK Japan KK.

The inventive ink composition with the ingredients described above can be produced by a commonly known process. For example, such a process involves the following steps of: mixing the ingredients; kneading the ingredients with, for example, a bead mill or a three-roll mill to disperse the pigments (i.e., the coloring agents and the extender pigments); optionally adding additives (e.g., polymerization inhibitors, alcohols and waxes); and then adjusting the viscosity by the addition of monomer ingredients and oil ingredients. The viscosity of the ink composition is, for example, 10 to 70 Pa·s as measured with a Laray viscometer at 25° C., which value is not essential.

Production of Printed Matter

Another aspect of the present invention provides a method for manufacturing printed matter, the method being characterized in that the inventive active energy ray-curable ink composition is used in printing. The inventive method for manufacturing printed matter is carried out by an ordinary printing technique except for the use of the inventive ink composition. Such a printing technique preferably includes a resin relief printing. Examples of print targets in the use of the resin relief printing are as already described.

Irradiation on undried printed matter with active energy rays can immediately turn an undried state to a dried state. This dried state can be achieved by curing the ink composition present on the surface of printed paper through the irradiation with the active energy rays. Known active energy rays, such as electron beams or ultraviolet rays, can be employed.

EXAMPLES

The present invention will be described in further detail by way of the following examples, although the present invention should not be limited to these examples. In the following description, "%" indicates "mass %" and "parts" indicates "parts by mass" unless otherwise specified. The unit of the sp value is $(cal/cm^3)^{1/2}$.

Synthetic Example 1

Coconut oil (800 parts) and pentaerythritol (36 parts) were mixed in a reaction chamber equipped with a stirrer, a reflux condenser, and a thermometer, and the mixture was kept at 250° C. for one hour to subject to a transesterification reaction. The mixture was cooled to 150° C., and rosin (160 parts), isophthalic acid (50 parts), and xylene for reflux were added to the mixture. The mixture was then gradually heated to 250° C. and kept for six hours to be subjected to a polycondensation reaction with dehydration. In order to remove xylene, the reaction was further continued under reduced pressure for three hours to distill off the solvent, thereby yielding a resin of Synthetic example 1. The resin of Synthetic example 1 had an acid value of 13 mg KOH/g, an sp value of 9.74 as measured by turbidimetric titration, and a weight average molecular weight (Mw) of 7,000 as measured by Gel Permeation Chromatography (GPC).

Synthetic Example 2

Coconut oil (800 parts) and pentaerythritol (36 parts) were mixed in a reaction chamber equipped with a stirrer, a reflux condenser, and a thermometer, and the mixture was kept at 250° C. for one hour to be subjected to a transesterification reaction. The mixture was cooled to 150° C., and dehydroabietic acid (160 parts), isophthalic acid (50 parts) and xylene for reflux were added to the mixture. The resultant mixture was then gradually heated to 250° C. and kept for six hours to be subjected to a polycondensation reaction with dehydration. In order to remove the xylene, the reaction was further continued under reduced pressure for three hours to distill off the solvent, thereby yielding a resin of Synthetic example 2. The resin of Synthetic example 2 had an acid value of 13 mg KOH/g, an sp value of 9.70 as measured by turbidimetric titration, and a weight average molecular weight (Mw) of 7,000 as measured by GPC.

Synthetic Example 3

Coconut oil (800 parts) and pentaerythritol (50 parts) were mixed in a reaction chamber equipped with a stirrer, a reflux condenser, and a thermometer, and the mixture was kept at 250° C. for one hour to be subjected to a transesterification reaction. The mixture was cooled to 150° C., and polymerized rosin (160 parts), isophthalic acid (50 parts), and xylene for reflux were added to the mixture. The resultant mixture was then gradually heated to 250° C. and kept for six hours to be subjected to a polycondensation reaction with dehydration. In order to remove the xylene, the reaction was further continued under reduced pressure for three hours to distill off the solvent, thereby yielding a resin of Synthetic example 3. The resin of Synthetic example 3 had an acid value of 12 mg KOH/g, an sp value of 9.73 as measured by turbidimetric titration, and a weight average molecular weight (Mw) of 14,000 as measured by GPC.

Synthetic Example 4

Coconut oil (800 parts), pentaerythritol (20 parts), and glycerin (16 parts) were mixed in a reaction chamber equipped with a stirrer, a reflux condenser, and a thermometer, and the mixture was kept at 250° C. for one hour to be subjected to a transesterification reaction. The mixture was cooled to 150° C., and rosin (160 parts), isophthalic acid (50 parts) and xylene for reflux were added to the mixture. The resultant mixture was then gradually heated to 250° C. and kept for six hours to be subjected to a polycondensation reaction with dehydration. In order to remove the xylene, the reaction was further continued under reduced pressure for three hours to distill off the solvent, thereby yielding a resin of Synthetic example 4. The resin of Synthetic example 4 had an acid value of 12 mg KOH/g, an sp value of 9.74 as measured by turbidimetric titration, and a weight average molecular weight (Mw) of 9,000 as measured by GPC.

Synthetic Example 5

Coconut oil (800 parts) and pentaerythritol (36 parts) were mixed in a reaction chamber equipped with a stirrer, a reflux condenser, and a thermometer, and the mixture was kept at 250° C. for one hour to be subjected to a transesterification reaction. The mixture was cooled to 150° C., and rosin (160 parts), fumaric acid (50 parts), and xylene for reflux were added to the mixture. The resultant mixture was then gradually heated to 250° C. and kept for six hours to be subjected to a polycondensation reaction with dehydration. In order to remove the xylene, the reaction was further continued under reduced pressure for three hours to distill off the solvent, thereby yielding a resin of Synthetic example 5. The resin of Synthetic example 5 had an acid value of 10 mg KOH/g, an sp value of 9.73 as measured by turbidimetric titration, and a weight average molecular weight (Mw) of 8,000 as measured by GPC.

Synthetic Example 6

Coconut oil (800 parts) and pentaerythritol (36 parts) were mixed in a reaction chamber equipped with a stirrer, a reflux condenser, and a thermometer, and the mixture was kept at 250° C. for one hour to be subjected to a transesterification reaction. The mixture was cooled to 150° C., and rosin (160 parts), 1,2-cyclohexenedicarboxylic acid (50 parts) and xylene for reflux were added to the mixture. The resultant mixture was then gradually heated to 250° C. and kept for six hours to be subjected to a polycondensation reaction with dehydration. In order to remove the xylene, the reaction was further continued under reduced pressure for three hours to distill off the solvent, thereby yielding a resin of Synthetic example 6. The resin of Synthetic example 6 had an acid value of 11 mg KOH/g, an sp value of 9.74 as measured by turbidimetric titration, and a weight average molecular weight (Mw) of 8,000 as measured by GPC.

Synthetic Example 7

Coconut oil (800 parts) and pentaerythritol (36 parts) were mixed in a reaction chamber equipped with a stirrer, a reflux condenser, and a thermometer, and the mixture was kept at 250° C. for one hour to be subjected to a transesterification reaction. The mixture was cooled to 150° C., and rosin (160 parts), 1,2-cyclohexenedicarboxylic acid (50 parts) and xylene for reflux were added to the mixture. The resultant mixture was then gradually heated to 250° C. and kept for six hours to be subjected to a polycondensation reaction with dehydration and then a further polycondensation reaction with the addition of benzoic acid (10 parts) at 250° C. for one hour. In order to remove the xylene, the reaction was further continued under reduced pressure for three hours to distill off the solvent, thereby yielding a resin of Synthetic example 7. The resin of Synthetic example 7 had an acid value of 11 mg KOH/g, an sp value of 9.73 as measured by turbidimetric titration, and a weight average molecular weight (Mw) of 6,000 as measured by GPC.

Synthetic Example 8

Coconut oil (800 parts) and pentaerythritol (36 parts) were mixed in a reaction chamber equipped with a stirrer, a reflux condenser, and a thermometer, and the mixture was kept at 250° C. for one hour to be subjected to a transesterification reaction. The mixture was cooled to 150° C., and rosin (160 parts), 1,2-cyclohexenedicarboxylic acid (50 parts) and xylene for reflux were added to the mixture. The resultant mixture was then gradually heated to 250° C. and kept for six hours to be subjected to a polycondensation reaction with dehydration and then a further polycondensation reaction with the addition of benzoic acid (10 parts) at 250° C. for one hour. In order to remove the xylene, the reaction was further continued under reduced pressure for three hours to distill off the solvent, thereby yielding a resin of Synthetic example 8. The resin of Synthetic example 8 had an acid value of 11 mg KOH/g, an sp value of 9.63 as measured by turbidimetric titration, and a weight average molecular weight (Mw) of 8,000 as measured by GPC.

Synthetic Example 9

Coconut oil (800 parts) and pentaerythritol (36 parts) were mixed in a reaction chamber equipped with a stirrer, a reflux condenser, and a thermometer, and the mixture was kept at 250° C. for one hour to be subjected to a transesterification reaction. The mixture was cooled to 150° C., and rosin (160 parts), isophthalic acid (50 parts), 1,2-cyclohexenedicarboxylic acid (10 parts) and xylene for reflux were added to the mixture. The resultant mixture was then gradually heated to 250° C. and kept for 12 hours to be subjected to a polycondensation reaction with dehydration. In order to remove the xylene, the reaction was further continued under reduced pressure for three hours to distill off the solvent, thereby yielding a resin of Synthetic example 9. The resin of Synthetic example 9 had an acid value of 6 mg KOH/g, an sp value of 9.73 as measured by turbidimetric titration, and a weight average molecular weight (Mw) of 19,000 as measured by GPC.

Synthetic Example 10

Coconut oil (800 parts) and pentaerythritol (36 parts) were mixed in a reaction chamber equipped with a stirrer, a reflux condenser, and a thermometer, and the mixture was kept at 250° C. for one hour to be subjected to a transesterification reaction. The mixture was cooled to 150° C., and rosin (160 parts), fumaric acid (50 parts), 1,2-cyclohexenedicarboxylic acid (10 parts) and xylene for reflux were added to the mixture. The resultant mixture was then gradually heated to 250° C. and kept for 12 hours to be subjected to a polycondensation reaction with dehydration. In order to remove the xylene, the reaction was further continued under reduced pressure for three hours to distill off the solvent, thereby yielding a resin of Synthetic example 10. The resin of Synthetic example 10 had an acid value of 5 mg KOH/g, an sp value of 9.74 as measured by turbidimetric titration, and a weight average molecular weight (Mw) of 21,000 as measured by GPC.

Synthetic Example 11

Coconut oil (800 parts) was charged in a reaction chamber equipped with a stirrer, a reflux condenser, and a thermometer, and heated to 150° C. Rosin (160 parts), 1,2-cyclohexenedicarboxylic acid (50 parts) and xylene for reflux were then added to the coconut oil, and the resultant mixture was then gradually heated to 250° C. and kept for 12 hours to be subjected to a polycondensation reaction with dehydration. In order to remove the xylene, the reaction was further continued under reduced pressure for three hours to distill off the solvent, thereby yielding a resin of Synthetic example 11. The resin of Synthetic example 11 had an acid value of 12 mg KOH/g, an sp value of 9.74 as measured by turbidimetric titration, and a weight average molecular weight (Mw) of 9,000 as measured by GPC.

Synthetic Example 12

Soybean oil (800 parts) was charged in a reaction chamber equipped with a stirrer, a reflux condenser, and a thermometer, and heated to 150° C. Rosin (160 parts), 1,2-cyclohexenedicarboxylic acid (50 parts) and xylene for reflux were then added to the soybean oil, and the resultant mixture was gradually heated to 250° C. and kept for 12 hours to be subjected to a polycondensation reaction with dehydration. In order to remove the xylene, the reaction was further continued under reduced pressure for three hours to distill off the solvent, thereby yielding a resin of Synthetic example 12. The resin of Synthetic example 12 had an acid value of 10 mg KOH/g, an sp value of 9.45 as measured by turbidimetric titration, and a weight average molecular weight (Mw) of 8,000 as measured by GPC.

Synthetic Example 13

Coconut oil (800 parts) was charged in a reaction chamber equipped with a stirrer, a reflux condenser, and a thermometer, and heated to 150° C. Disproportionated rosin (160 parts), 1,2-cyclohexenedicarboxylic acid (50 parts) and xylene for reflux were then added to the coconut oil, and the resultant mixture was gradually heated to 250° C. and kept for 12 hours to be subjected to a polycondensation reaction with dehydration. In order to remove the xylene, the reaction was further continued under reduced pressure for three hours to distill off the solvent, thereby yielding a resin of Synthetic example 13. The resin of Synthetic example 13 had an acid value of 12 mg KOH/g, an sp value of 9.76 as measured by turbidimetric titration, and a weight average molecular weight (Mw) of 8,000 as measured by GPC.

Synthetic Example 14

Coconut oil (800 parts) was charged in a reaction chamber equipped with a stirrer, a reflux condenser, and a thermometer, and heated to 150° C. Rosin (160 parts), fumaric acid (50 parts) and xylene for reflux were then added to the coconut oil, and the resultant mixture was gradually heated to 250° C. and kept for 12 hours to be subjected to a polycondensation reaction with dehydration. In order to remove the xylene, the reaction was further continued under reduced pressure for three hours to distill off the solvent, thereby yielding a resin of Synthetic example 14. The resin of Synthetic example 14 had an acid value of 10 mg KOH/g, an sp value of 9.74 as measured by turbidimetric titration, and a weight average molecular weight (Mw) of 9,000 as measured by GPC.

Synthetic Example 15

Coconut oil (800 parts) was charged in a reaction chamber equipped with a stirrer, a reflux condenser, and a thermometer, and heated to 150° C. Rosin (160 parts), fumaric acid (50 parts) and xylene for reflux were then added to the coconut oil, and the resultant mixture was gradually heated to 250° C. and kept for 12 hours to be subjected to a polycondensation reaction with dehydration and then a further polycondensation reaction with the addition of benzoic acid (10 parts) at 250° C. for one hour. In order to further remove the xylene, the reaction was continued under reduced pressure for three hours to distill off the solvent, thereby yielding a resin of Synthetic example 15. The resin of Synthetic example 15 had an acid value of 11 mg KOH/g, an sp value of 9.73 as measured by turbidimetric titration, and a weight average molecular weight (Mw) of 8,000 as measured by GPC.

Synthetic Example 16

Soybean oil (800 parts) was charged in a reaction chamber equipped with a stirrer, a reflux condenser, and a thermometer, and heated to 150° C. Rosin (160 parts), fumaric acid (50 parts), and xylene for reflux were added to the soybean oil, and the resultant mixture was then gradually heated to 250° C. and kept for 12 hours to be subjected to a polycondensation reaction with dehydration, and then a further polycondensation reaction with the addition of benzoic acid (10 parts) at 250° C. for one hour. In order to further remove the xylene, the reaction was continued under reduced pressure for three hours to distill off the solvent, thereby yielding a resin of Synthetic example 16. The resin of Synthetic example 16 had an acid value of 11 mg KOH/g, an sp value of 9.62 as measured by turbidimetric titration, and a weight average molecular weight (Mw) of 7,000 as measured by GPC.

Comparative Synthetic Example 1

Coconut oil (800 parts) and pentaerythritol (36 parts) were mixed in a reaction chamber equipped with a stirrer, a reflux condenser, and a thermometer, and the mixture was kept at 250° C. for one hour to be subjected to a transesterification reaction. The mixture was cooled to 150° C., and rosin (160 parts) and xylene for reflux were added to the mixture. The resultant mixture was then gradually heated to 250° C. and kept for 12 hours to be subjected to a polycondensation reaction with dehydration. In order to remove the xylene, the reaction was further continued under reduced pressure for three hours to distill off the solvent, thereby yielding a resin of Comparative synthetic example 1. The resin of Comparative synthetic example 1 had an acid value of 21 mg KOH/g, an sp value of 8.84 as measured by turbidimetric titration, and a weight average molecular weight (Mw) of 5,000 as measured by GPC.

Comparative Synthetic Example 2

Soybean oil (800 parts) and pentaerythritol (36 parts) were mixed in a reaction chamber equipped with a stirrer, a reflux condenser, and a thermometer, and the mixture was kept at 250° C. for one hour to be subjected to a transesterification reaction. The mixture was cooled to 150° C., and rosin (160 parts) and xylene for reflux were added to the mixture. The resultant mixture was then gradually heated to 250° C. and kept for 12 hours to be subjected to a polycondensation reaction with dehydration. In order to remove the xylene, the reaction was further continued under reduced pressure for three hours to distill off the solvent, thereby yielding a resin of Comparative synthetic example 2. The resin of Comparative synthetic example 2 had an acid value of 18 mg KOH/g, an sp value of 8.89 as measured by turbidimetric titration, and a weight average molecular weight (Mw) of 7,000 as measured by GPC.

Comparative Synthetic Example 3

Coconut oil (800 parts), rosin (160 parts), pentaerythritol (36 parts), and xylene for reflux were mixed in a reaction chamber equipped with a stirrer, a reflux condenser, and a thermometer. The resultant mixture was then gradually heated to 250° C. and kept for 12 hours to be subjected to a polycondensation reaction with dehydration. In order to remove the xylene, the reaction was further continued under reduced pressure for three hours to distill off the solvent, thereby yielding a resin of Comparative synthetic example 3. The resin of Comparative synthetic example 3 had an acid value of 17 mg KOH/g, an sp value of 8.91 as measured by turbidimetric titration, and a weight average molecular weight (Mw) of 8,000 as measured by GPC.

Comparative Synthetic Example 4

Soybean oil (800 parts), rosin (160 parts), pentaerythritol (36 parts), and xylene for reflux were mixed in a reaction chamber equipped with a stirrer, a reflux condenser, and a thermometer. The resultant mixture was then gradually heated to 250° C. and kept for 12 hours to be subjected to a polycondensation reaction with dehydration. In order to remove the xylene, the reaction was further continued under reduced pressure for three hours to distill off the solvent, thereby yielding a resin of Comparative synthetic example 4. The resin of Comparative synthetic example 4 had an acid value of 18 mg KOH/g, an sp value of 8.85 as measured by turbidimetric titration, and a weight average molecular weight (Mw) of 8,000 as measured by GPC.

Preparation of Varnishes 1 to 16

Each resin (80 parts) of Synthetic examples 1 to 16, HDDA (1,6-hexanediol diacrylate) (40 parts) and methyl hydroquinone (1 part) were placed in a reaction chamber equipped with a cooling tube and heated at 100° C. for one hour with stirring to prepare Varnishes 1 to 16. All the resulting varnishes were transparent and had good compatibility. In contrast, all resins of Comparative synthetic examples 1 to 4 had poor compatibility that precludes preparation of varnish.

Preparation of Varnish 17

A mixture of poly(diallyl phthalate)(A-DAP available from Osaka Soda Co., Ltd.)(80 parts), HDDA (40 parts) and methyl hydroquinone (1 part) was dissolved by heating at 100° C. for 60 minutes to prepare Varnish 17.

Preparation of Varnish 18

A commercially available polyester acrylate (EBE-CRYL524 available from Daicel Allnex Ltd.; a mixture of 70% polyester and 30% HDDA) was used as Varnish 18.

Preparation of Ink Compositions 1 to 16

Ink compositions 1 to 16 were prepared with Varnishes 1 to 16 produced in the above procedure, respectively. The numbering system(numbers of 1 to 16) of these ink compositions correspond to the numbering system of the varnishes used in the preparation of the ink compositions. All ink compositions were prepared by the following procedure: HDDA (5.5 parts), each of the varnishes (45 parts), phthalocyanine blue (25 parts), Irgacure 907 (available from BASF) (10 parts), 4,4'-bis (diethylamino) benzophenone (EAB) (5 parts), and methyl hydroquinone (0.2 parts) were mixed, the mixture was kneaded with a three-roll mill having a roll temperature of 40° C. until the particle size became 5.0 μm or less, and polyethylene wax (3 parts) was added to the kneaded mixture. Ink compositions 1 to 16 prepared by such a procedure all correspond to examples in the present invention.

Preparation of Ink Composition 17

Ink composition 17 was prepared with Varnish 17 produced as above. The ink composition was prepared by the following procedure: HDDA (5.5 parts), Varnish 17 (45 parts), phthalocyanine blue (25 parts), Irgacure 907 (available from BASF) (10 parts), 4,4'-bis (diethylamino) benzophenone (EAB) (5 parts), and methyl hydroquinone (0.2 parts) were mixed, the mixture was kneaded with a three-roll mill having a roll temperature of 40° C. until the particle size became 5.0 μm or less, and polyethylene wax (3 parts) was added to the kneaded mixture. Ink composition 17 prepared by such a procedure corresponds to a comparative example using the poly(diallyl phthalate) resin.

Preparation of Ink Composition 18

Ink composition 18 was prepared with Varnish 18 produced as above. The ink composition was prepared by the following procedure: HDDA (5.5 parts), Varnish 18 (45 parts), phthalocyanine blue (25 parts), Irgacure 907 (available from BASF) (10 parts), 4,4'-bis (diethylamino) benzophenone (EAB) (5 parts), and methyl hydroquinone (0.2 parts) were mixed, the mixture was kneaded with a three-roll mill having a roll temperature of 40° C. until the particle size became 5.0 μm or less, and polyethylene wax (3 parts) was added to the kneaded mixture. Ink composition 18 corresponds to a reference example using chlorinated polyester acrylate.

Biomass Count

For Ink compositions 1 to 18, the amounts of biomass-derived ingredients (unit: mass %) were calculated, respectively. The results are listed in the column "Biomass" in Tables 1 and 2.

Evaluation of Curability

Ink compositions 1 to 18 were each spread on art paper (Toku Art 110K, available from Mitsubishi Paper Mills Ltd.) in an amount of 0.1 mL/204 $cm^2$ with an RI-2 drawdown machine (Two-split roll, manufactured by Akira Co., Ltd.) to prepare test pieces. Each test piece was then irradiated with ultraviolet rays using a metal halide lamp having a power of 160 W/cm (focal length: 13 cm, light condensing type, single lamp; manufactured by Heraeus Holding GmbH). During the irradiation, the curing rate at which the ink composition became tack-free was evaluated by touching with fingers. The results are ranked into three evaluation criteria as below, and are shown in the column "Curability" in Tables 1 and 2.

Evaluation Criteria

O: Curing rate of 100 m/min or more
Δ: Curing rate of 60 m/min to less than 100 m/min
X: Curing rate of less than 60 m/min Evaluation of Adhesion Ink compositions 1 to 18 were each spread on a biaxially stretched polypropylene film having a thickness of 20 μm (P2161: OPP film, available from Toyobo Co., Ltd.) in an amount of 0.1 mL/204 $cm^2$ with an RI-2 drawdown machine (Two-split roll, manufactured by Akira Co., Ltd.) to prepare test pieces. Each test piece was then irradiated with ultraviolet rays using a metal halide lamp having a power of 160 W/cm (focal length: 13 cm, light condensing type, single lamp; manufactured by Heraeus Holding GmbH) until the ink composition became tack-free determined by touching with fingers. The cured film of ink composition present on the surface of each test piece was then rubbed with nails to evaluate the level of flaking of the film. The OPP film was used for evaluation of the adhesion to synthetic resin. Good adhesion to the OPP film causes no flaking of the film, and poor adhesion to the OPP film causes flaking of the film. The results are ranked into three evaluation criteria as below, and are shown in the column "Adhesion" in Tables 1 and 2.

Evaluation Criteria

O: No flaking is observed, and good adhesion
Δ: Some flaking is observed, but within the range of practical use
X: Significant flaking is observed, and poor adhesion Evaluation of Flowability For Ink compositions 1 to 18, the slope values were determined using a spread meter, respectively. The slope value is a numerical value that is an index of flowability of the ink composition. The measurements are listed in the column "Flowability" in Tables 1 and 2.

TABLE 1

| Ink number | 1 | 2 | 3 | 4 | 5 | 6 | 7 | 8 | 9 |
|---|---|---|---|---|---|---|---|---|---|
| Biomass | 10 or more | 10 or more | 10 or more | 10 or more | 10 or more | 10 or more | 10 or more | 10 or more | 10 or more |
| Curability | O | O | O | O | O | O | O | O | O |
| Adhesion | O | O | O | O | O | O | O | O | O |
| Flowability | 6.7 | 7.1 | 7.2 | 6.9 | 6.4 | 6.7 | 6.5 | 6.8 | 6.4 |

TABLE 2

| Ink number | 10 | 11 | 12 | 13 | 14 | 15 | 16 | 17 | 18 |
|---|---|---|---|---|---|---|---|---|---|
| Biomass | 10 or more | 10 or more | 10 or more | 10 or more | 10 or more | 10 or more | 10 or more | 0 | 0 |
| Curability | O | O | O | O | O | O | O | O | O |
| Adhesion | O | O | O | O | O | O | O | X | O |
| Flowability | 6.4 | 6.5 | 6.2 | 6.3 | 6.5 | 6.9 | 6.4 | 6.6 | 6.3 |

As shown in Tables 1 and 2, Ink compositions 1 to 16 of the present invention exhibit superior curability, adhesion, and flowability even though they have a biomass count of 10 mass % or more, and have a comparable adhesion level to Ink composition 18 (the reference example) containing polyester used as an adhesive aid. These results demonstrate that the inventive ink composition has sufficient properties for an active energy ray-curable ink composition regardless of a high biomass count. In contrast, the ink compositions prepared with rosin-modified alkyd resins having a sp value lower than a predetermined value (Comparative synthetic examples 1 to 4) could not be used in an active energy ray-curable ink composition, because some problems, such as separation of ingredients, occur due to insufficient compatibility.

The invention claimed is:

1. A method of manufacturing printed matter, the method comprising:
   printing on a synthetic resin base material via a resin relief printing that uses an active energy ray-curable ink composition, wherein
   the active energy ray-curable ink composition comprises:
      a pigment,
      a compound having ethylenically unsaturated bonds, and
      a rosin-modified alkyd resin, and
   the rosin-modified alkyd resin is a condensed polymer of an acid ingredient containing a resin acid, a fatty acid, and a polybasic acid with a polyhydric alcohol, and has a solubility parameter value of 9.0 to 11.0 $(cal/cm^3)^{1/2}$ as measured by turbidimetric titration and an acid value of 1 to 50 mg KOH/g.

2. The method of manufacturing printed matter according to claim 1, wherein the oil length, which is the ratio (mass %) of the mass of the fatty acid moiety to the mass of the entire rosin-modified alkyd resin, is 30 to 85.

3. The method of manufacturing printed matter according to claim 1, wherein the rosin-modified alkyd resin contains a fatty acid having 8 to 16 carbon atoms.

4. The method of manufacturing printed matter according to claim 1, wherein the rosin-modified alkyd resin contains a fatty acid of coconut oil or palm kernel oil.

5. The method of manufacturing printed matter according to claim 1, wherein the rosin-modified alkyd resin has a weight average molecular weight of 1,000 to 70,000 g/mol.

6. The method of manufacturing printed matter according to claim 1, wherein the active energy ray-curable ink composition further contains a photopolymerization initiator.

\* \* \* \* \*